(12) United States Patent
Shim

(10) Patent No.: US 7,238,141 B2
(45) Date of Patent: Jul. 3, 2007

(54) SEVEN-SPEED POWERTRAIN OF AN AUTOMATIC TRANSMISSION FOR A VEHICLE

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 177 days.

(21) Appl. No.: 11/221,277

(22) Filed: Sep. 7, 2005

(65) Prior Publication Data

US 2007/0054772 A1    Mar. 8, 2007

(51) Int. Cl.
*F16H 3/62* (2006.01)
(52) U.S. Cl. ...................................... 475/276
(58) Field of Classification Search ............... 475/276, 475/275
See application file for complete search history.

(56) References Cited

U.S. PATENT DOCUMENTS 7,131,925 B2 * 11/2006 Shim ........................... 475/277
7,192,377 B2 * 3/2007 Shim ........................... 475/269
2005/0202925 A1 * 9/2005 Shim ........................... 475/278

FOREIGN PATENT DOCUMENTS

| DE | 102 21 095 A1 | 7/2004 |
| DE | 102004048696 A1 | 5/2005 |
| DE | 102004055289 A1 | 8/2005 |

\* cited by examiner

*Primary Examiner*—Dirk Wright
(74) *Attorney, Agent, or Firm*—Morgan Lewis & Bockius LLP

(57) ABSTRACT

A seven-speed powertrain for an automatic transmission includes first, second and third single pinion planetary gear sets, each having a first gear, a ring gear, and a planet carrier as an operating member thereof. The first, the second, and the third single pinion planetary gear sets are arranged on an input shaft and combined by a plurality of frictional elements including first, second, and third brakes, and first, second, and third clutches.

6 Claims, 4 Drawing Sheets

FIG.2

| frictional elements | clutch | | | brake | | | OWC |
|---|---|---|---|---|---|---|---|
| | C1 | C2 | C3 | B1 | B2 | B3 | |
| shift speed — first forward speed | | | | ● | ○ | | ● |
| second forward speed | | | | ● | | ● | |
| third forward speed | | | ● | ● | | | |
| fourth forward speed | ● | | | ● | | | |
| fifth forward speed | | ● | | | | ● | |
| sixth forward speed | ● | ● | | | | | |
| seventh forward speed | ● | | | | | ● | |
| R | | | ● | | ● | | |
| N, P | | | | | ● | | |

SEVEN-SPEED POWERTRAIN OF AN AUTOMATIC TRANSMISSION FOR A VEHICLE

BACKGROUND OF THE INVENTION (a) Field of the Invention

The present invention relates to a seven-speed powertrain of an automatic transmission for a vehicle.

(b) Description of the Related Art

A powertrain of an automatic transmission for vehicles has been developed in different ways depending on the vehicle company, and a four-speed or five-speed powertrain is generally used. However, a six-speed automatic transmission has been recently developed and adopted to some vehicles, and a seven-speed automatic transmission is also being developed.

In one example of a seven-speed automatic transmission, a single pinion planetary gear set and one Ravingneaux type compound planetary gear set are combined using three clutches and three brakes to realize seven speeds.

However, although such a powertrain may realize seven forward speeds and one reverse speed, there can be a number of drawbacks. For example, the position of the third brake may hinder a hydraulic line for supplying operating pressure to the first and second clutches. In addition, because the Ravingneaux type compound planetary gear set has a large radial-direction size, such a powertrain has a drawback in drag torque, poor controllability, and a poor durability of the planetary gear because the number of operational elements is great. For the same reason, it has poor productivity and poor design freedom.

The above information disclosed in this Background section is only for enhancement of understanding of the background of the invention and therefore it may contain information that does not form the prior art that is already known in this country to a person or ordinary skill in the art.

SUMMARY OF THE INVENTION

Embodiments of the present invention has provide a seven-speed powertrain of an automatic transmission having advantages of realizing a seven-speed powertrain by adding one clutch to the combination of three single pinion planetary gear sets of a conventional six-speed powertrain and thereby having advantages in a gear ratio and a step ratio and improving a shift feeling due to a decrease of the number of operational elements.

In addition, embodiments of the present invention provide a seven-speed powertrain of an automatic transmission having advantages of having a high durability and improving productivity and design freedom by achieving a powertrain combining only single pinion planetary gear sets, and allowing a skip shift within three shift speed steps at fourth, fifth, sixth, and seventh forward speeds thereby improving a shift responsiveness.

An exemplary seven-speed powertrain of an automatic transmission according to an embodiment of the present invention includes: a first single pinion planetary gear set having a first sun gear, a first ring gear, and a first planet carrier as an operating member thereof, a second single pinion planetary gear set having a second sun gear, a second ring gear, and a second planet carrier as an operating member thereof; and a third single pinion planetary gear set having a third sun gear, a third ring gear, and a third planet carrier as an operating member thereof. The first, second, and third single pinion planetary gear sets are arranged on an input shaft and combined by a plurality of frictional elements comprising first, second, and third brakes, and first, second, and third clutches. The first ring gear is fixedly connected to the second planet carrier, the second ring gear is fixedly connected to the third planet carrier, and the third ring gear is fixedly connected to the first planet carrier. The second planet carrier is variably connected to the input shaft via a first clutch that operates at a fourth forward speed, a sixth forward speed, and a seventh forward speed. The first sun gear is variably connected to the input shaft via a second clutch that operates in a fifth and sixth forward speed and is variably connected to a transmission case via a first brake that operates at a first, second, third, and fourth forward speed. The second sun gear is fixedly connected to the input shaft to operate always as an input element. The third planet carrier is variably connected to the transmission case via the second brake that operates at a reverse speed and a one-way clutch that operates at a first forward speed. The third sun gear is variably connected to the input shaft via the third clutch that operates at the third forward speed and at the reverse speed, and is variably connected to the transmission case via the third brake that operates the second forward speed, the fifth forward speed, and the seventh forward speed. The third ring gear is connected to an output gear.

The third clutch, the second brake, and the third brake may be disposed in a front portion inside the transmission case, and the first clutch, the second clutch, and the first brake may be disposed in a rear portion inside the transmission case.

The one-way clutch and the second brake may be disposed in parallel inside the transmission case and may be connected to the third planet carrier.

The first brake and the one-way clutch may be operated for the first forward speed; the first brake and the third brake may be operated for the second forward speed; the first brake and the third clutch may be operated for the third forward speed; the first brake and the first clutch may be operated for the fourth forward speed; the second clutch and the third brake may be operated for the fifth forward speed; the first clutch and the second clutch may be operated for the sixth forward speed; the first clutch and the third brake may be operated for the seventh forward speed; and the third clutch and the second brake may be operated for the reverse speed.

A skip shift within three shift speed steps may be possible at the forward fourth, fifth, sixth, and seventh speeds through an operation control of the frictional elements.

BRIEF DESCRIPTION OF THE DRAWINGS

FIG. 2 is an operational chart of frictional elements of a powertrain according to an exemplary embodiment of the present invention.

DETAILED DESCRIPTION OF THE EMBODIMENTS

An embodiment of the present invention will hereinafter be described in detail with reference to the accompanying drawings.

Figure 1:
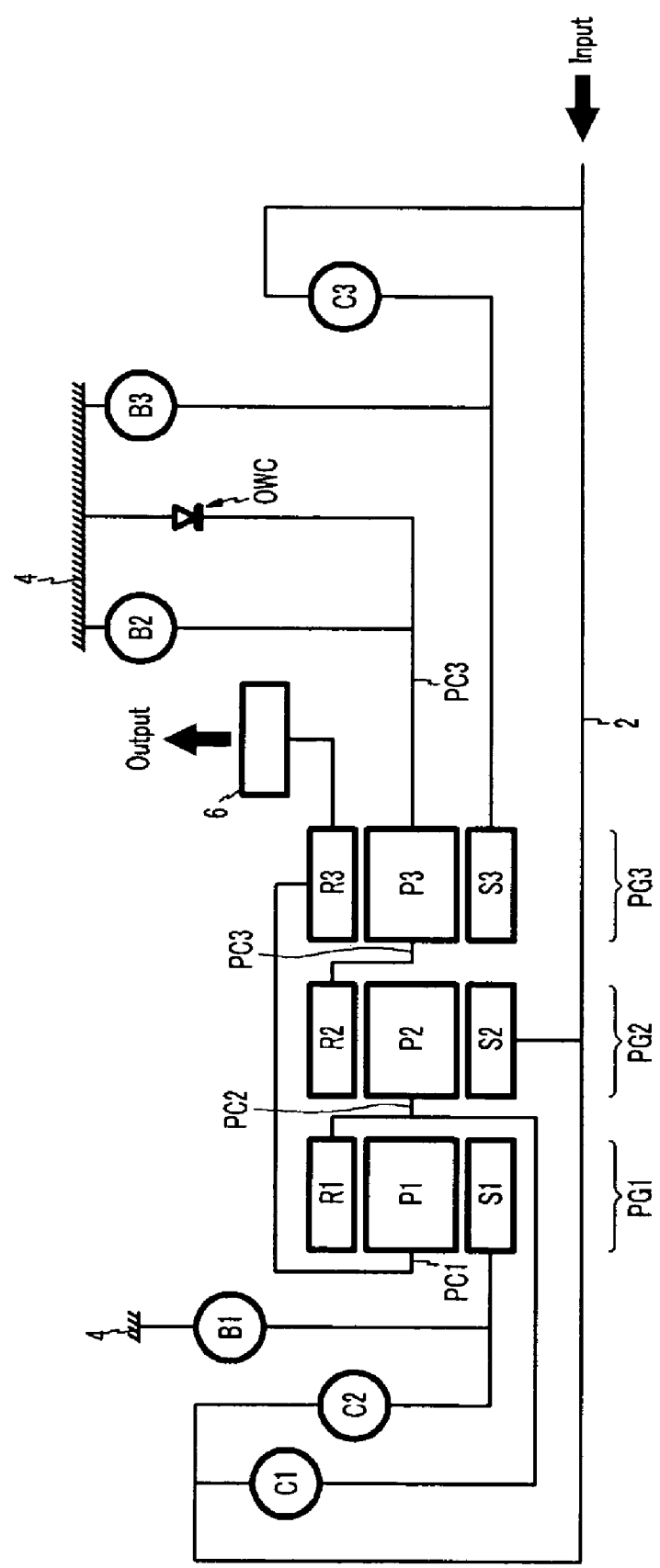
FIG. 1 is a schematic diagram of a powertrain of an automatic transmission according to an exemplary embodiment of the present invention.

As shown in FIG. 1, a powertrain of an automatic transmission according to an exemplary embodiment of the present invention includes first, second, and third planetary gear sets PG1, PG2, and PG3 arranged on an input shaft 2 connected to an engine output side via a torque converter, and three planetary gear sets are arranged in a sequence of the first, second, and third planetary gear sets PG1, PG2, and PG3 from a rear portion to a front portion of a transmission. The first planetary gear set PG1 is formed as a single pinion planetary gear set having the operating members of a first sun gear S1, a first ring gear R1, and a first planet carrier PC1 rotatably supporting a first pinion gear P1 engaged with the first sun gear S1 and the first ring gear R1. The second planetary gear set PG2 is formed as a single pinion planetary gear set having the operating members of a second sun gear S2, a second ring gear R2, and a second planet carrier PC2 rotatably supporting a second pinion gear P2 engaged with the second sun gear S2 and the second ring gear R2. The third planetary gear set PG3 is formed as a single pinion planetary gear set having operating members of a third sun gear S3, a third ring gear R3, and a third planet carrier PC3 rotatably supporting a third pinion gear P3 engaged with the third sun gear S3 and the third ring gear R3. The first, second, and third planetary gear sets PG1, PG2, and PG3 are disposed in a sequence of the first, second, and third planetary gear sets PG1, PG2, and PG3 from a rear portion of a transmission to a front portion thereof.

The first ring gear R1 is fixedly connected to the second planet carrier PC2, the second ring gear R2 is fixedly connected to the third planet carrier PC3, and the first planet carrier PC1 is fixedly connected to the third ring gear R3. The second sun gear S2 is fixedly connected to the input shaft 2 so as to always act as an input element. The first sun gear S1, the third sun gear S3, and the first ring gear R1 are respectively variably connected to the input shaft 2 via second, third, and first clutches C2, C3, and C1 so as to variably act as input elements.

The first and third sun gears S1 and S3 are respectively variably connected to a transmission case 4 via first and third brakes B1 and B3 so as to variably act as fixed elements. In addition, the third planet carrier PC3 is variably connected to the transmission case 4 via a second brake B2 and a one-way clutch OWC, which are disposed in parallel, so as to variably act as a fixed element. The third ring gear R3 is fixedly connected to an output gear 6 so as to always act as an output element. The first clutch C1, the second clutch C2, and the first brake B1 are disposed in a rear portion inside the transmission case, and the third clutch C3, the second brake B2, and the third brake B3 are disposed in a front portion inside the transmission case.

A powertrain according to an embodiment of the present invention may be operated by an operational chart shown in FIG. 2 thereby realizing seven forward speeds and one reverse speed. That is, the first brake B1 and the one-way clutch OWC are operated at a first forward speed, the first and third brakes B1 and B3 are operated at a second forward speed, and the third clutch C3 and the first brake B1 are operated at a third forward speed. The first clutch C1 and the first brake B1 are operated at a fourth forward speed, the second clutch C2 and the third brake B3 are operated at a fifth forward speed, the first and second clutches C1 and C2 are operated at a sixth forward speed, and the first clutch C1 and the third brake B3 are operated at a seventh forward speed. The third clutch C3 and the second brake B2 are operated at a reverse speed.

Figure 3:
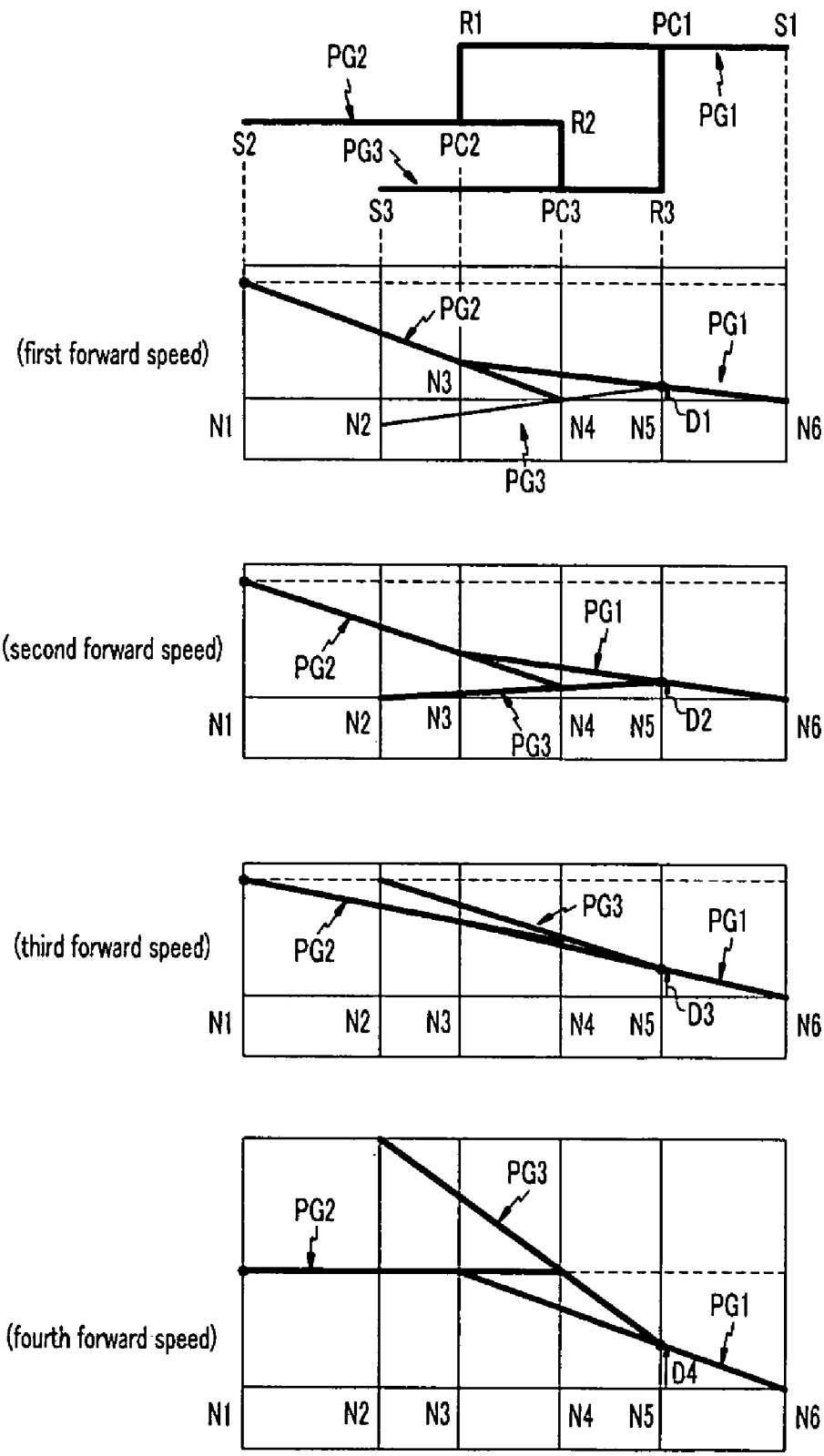
FIG. 3 is a speed diagram by a lever analysis method for first through fourth forward speeds of a powertrain according to an exemplary embodiment of the present invention.

According to a powertrain according to an embodiment of the present invention, three single pinion planetary gear sets are combined, the first ring gear R1 and the second planet carrier PC2, the second ring gear R2 and the third planet carrier PC3, the third ring gear R3 and the first planet carrier PC1 are fixedly connected, so that the powertrain may form six nodes as shown in FIG. 3. That is, a first node N1 is formed by the second sun gear S2, a second node N2 is formed by the third sun gear S3, a third node N3 is formed by the first ring gear R1 and the second planet carrier PC2, a fourth node N4 is formed by the second ring gear R2 and the third planet carrier PC3, a fifth node N5 is formed by the first planet carrier PC1 and the third ring gear R3, and a sixth node N6 is formed by the first sun gear S1.

Figure 4:
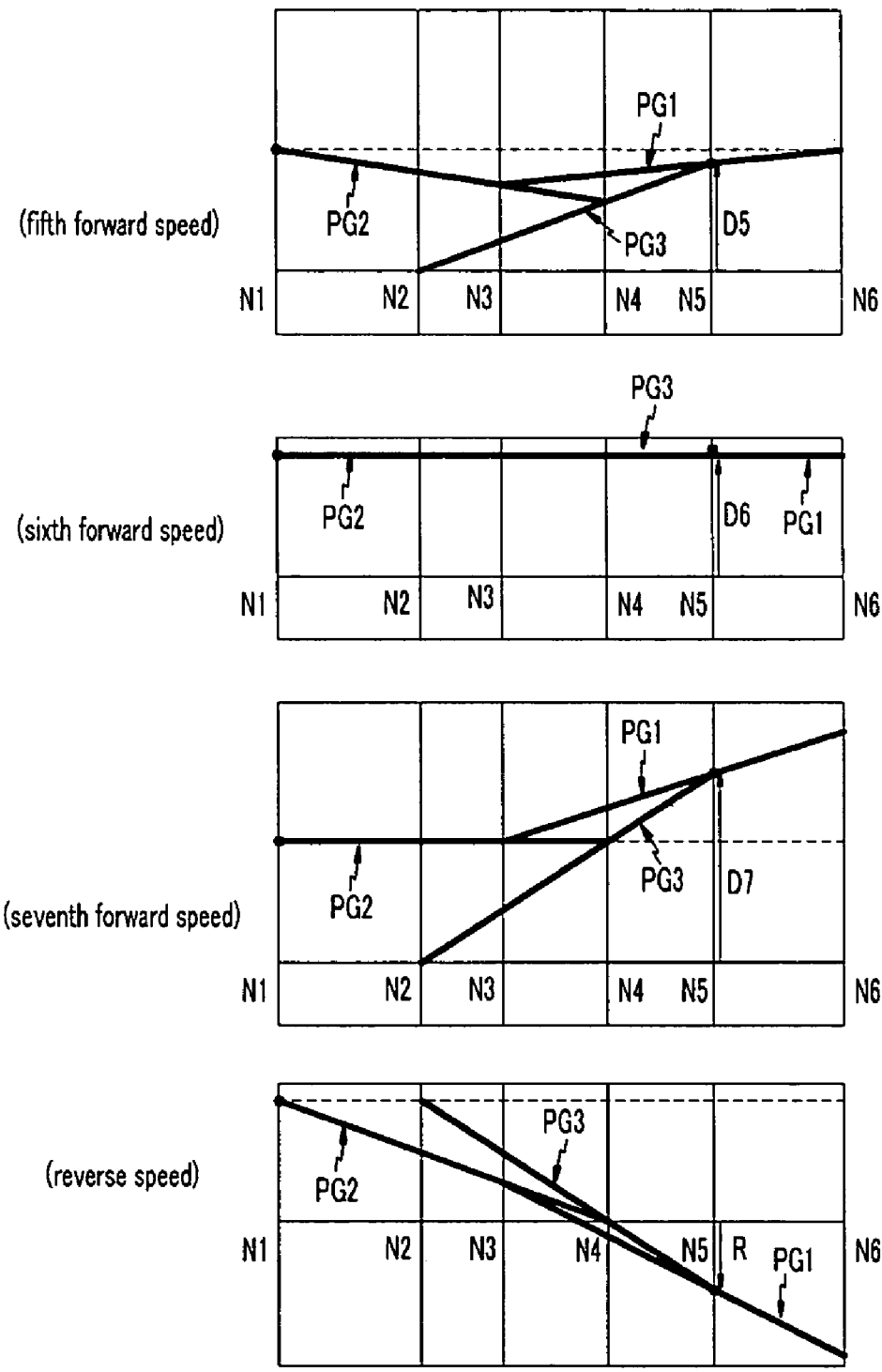
FIG. 4 is a speed diagram by a lever analysis method for fifth through seventh forward speeds and a reverse speed of a powertrain according to an exemplary embodiment of the present invention.

Referring to FIG. 3 and FIG. 4, operations of a powertrain according to an exemplary embodiment of the present invention will be described in detail. For the first forward speed, the first brake B1 and the one-way clutch OWC are operated. Then, the first node N1 receives an input, and the fourth node N4 and the sixth node N6 act as fixed elements. Therefore, speed lines of the first forward speed are formed as shown in FIG. 3, as a result of cooperation of the first, second, and third planetary gear sets PG1, PG2, and PG3. Accordingly, the output element of the fifth node N5 rotates at a speed of D1, and so the first forward speed is realized.

For the second forward speed, the third brake B3 is operated from the state of the first forward speed. Then, the first node N1, i.e., the second sun gear S2, receives an input, and the second node N2 and the sixth node N6 act as fixed elements. Therefore, speed lines of the second forward speed are formed as shown in FIG. 3, as a result of cooperation of the first, second, and third planetary gear sets PG1, PG2, and PG3. Accordingly, the output element of the fifth node N5 rotates at a speed of D2, and so the second forward speed is realized.

For the third forward speed, the operation of the third brake B3 is released from the state of the second forward speed, and the third clutch C3 is operated. Then, the first node N1, i.e., the second sun gear S2, and the second node N2, i.e., the third sun gear S3, respectively receive an input, and the sixth node N6 acts as a fixed element. Therefore, speed lines of the third forward speed are formed as shown in FIG. 3, as a result of cooperation of the first, second, and third planetary gear sets PG1, PG2, and PG3. Accordingly, the output element of the fifth node N5 rotates at a speed of D3, and so the third forward speed is realized.

For the fourth forward speed, the operation of the third clutch C3 is released from the state of the third forward speed, and the first clutch C1 is operated. Then, the first node N1, i.e., the second sun gear S2, and the third node N3, i.e., the second planet carrier PC2 and the first ring gear R1, respectively receive an input, and thereby the second planetary gear set PG2 rotates as one body. The sixth node N6 acts as a fixed element. Therefore, speed lines of the fourth forward speed are formed as shown in FIG. 3, as a result of cooperation of the first, second, and third planetary gear sets PG1, PG2, and PG3. Accordingly, the output element of the fifth node N5 rotates at a speed of D4, and so the fourth forward speed is realized.

For the fifth forward speed, the operations of the first clutch C1 and the first brake B1 are released from the state of the fourth forward speed, and the second clutch C2 and the third brake B3 are operated. Then, the first node N1, i.e., the second sun gear S2 and the sixth node N6, i.e., the first sun gear S1, respectively receive an input, and the second node N2 acts as a fixed element. Therefore, speed lines of the fifth forward speed are formed as shown in FIG. 4, as a result of cooperation of the first, second, and third planetary gear sets PG1, PG2, and PG3. Accordingly, the output element of the fifth node N5 rotates at a speed of D5, and so the fifth forward speed is realized.

For the sixth forward speed, the operation of the third brake B3 is released from the state of the fifth forward speed, and the first clutch C1 is operated. Then, the first node N1, i.e., the second sun gear S2, the third node N3, i.e., the second planet carrier PC2 and the first ring gear R1, and the sixth node N6, i.e., the first sun gear S1, respectively receive an input, and there is no fixed element. Therefore, all of the first, second, and third planetary gear sets PG1, PG2, and PG3 are in a state of direct coupling, so speed lines of the sixth forward speed are formed as shown in FIG. 4. Accordingly, the output element of the fifth node N5 rotates at a speed of D6, and so the sixth forward speed is realized.

For the seventh forward speed, the operation of the second clutch C2 is released from the state of the sixth forward speed, and the third brake B3 is operated. Then, the first node N1, i.e., the second sun gear S2, and the third node N3, i.e., the second planet carrier PC2 and the first ring gear R1, respectively receive an input, and thereby the second planetary gear set PG2 rotates as one body. The second node N2, i.e., the third sun gear S3, acts as a fixed element. Therefore, speed lines of the seventh forward speed are formed as shown in FIG. 4, as a result of cooperation of the first, second, and third planetary gear sets PG1, PG2, and PG3. Accordingly, the output element of the fifth node N5 rotates at a speed of D7, and so the seventh forward speed is realized.

For the reverse speed, the third clutch C3 and the second brake B2 are operated. Then, the first node N1, i.e., the second sun gear S2, and the second node N2, i.e., the third sun gear S3, respectively receive an input, and the fourth node N4 acts as a fixed element. Therefore, speed lines of the reverse speed are formed as shown in FIG. 4, as a result of cooperation of the first, second, and third planetary gear sets PG1, PG2, and PG3. Accordingly, the output element of the fifth node N5 rotates at a speed of R, and so the reverse speed is realized.

A person of ordinary skill in the art can easily understand the speed lines of each planetary gear set, so a detailed description therefore will be omitted.

In a powertrain according to an embodiment of the-present invention, a shift ratio may be 4.947 at the first forward speed, 2.924 at the second forward speed, 1.908 at the third forward speed, 1.391 at the fourth forward speed, 1.223 at the fifth forward speed, 1.000 at the sixth forward speed, and 0.792 at the seventh forward speed.

Referring to FIGS. 2 to 4, a skip shift within three shift speed steps can be achieved by releasing one operational element and operating one operational element, or by releasing two operational elements and operating two operational elements. Therefore, a shift performance of an automatic transmission can be improved. In more detail, a fourth to second skip shift can be realized by releasing the operation of the first clutch C1 from the state of the fourth forward speed and operating the third brake B3, a fifth to second skip shift can be realized by releasing the second clutch C2 from the state of the fifth forward speed and operating the first brake 1, and a sixth to fourth skip shift can be realized by releasing the second clutch C2 from the state of the sixth forward speed and operating the first brake B1.

In addition, a seventh to fifth skip shift can be realized by releasing the first clutch C1 from the state of the seventh forward speed and operating the second clutch C2, and a seventh to fourth skip shift can be realized by releasing the third brake B3 from the state of the seventh forward speed and operating the first brake B1. Accordingly, these skip shifts can be realized by releasing one operational element and operating one operational element.

Further, a fifth to third skip shift can be realized by releasing the second clutch C2 and the third brake B3 from the state of the fifth forward speed and operating the third clutch C3 and the first brake B1, and a sixth to third skip shift can be realized by releasing the first clutch C1 and the second clutch C2 from the state of the sixth forward speed and operating the third clutch C3 and the first brake B1. Accordingly, these skip shifts can be realized by releasing two operational elements and operating two operational elements.

A powertrain according to embodiments of the present invention can be achieved by adding one clutch to the combination of three single pinion planetary gear sets of a conventional six-speed powertrain that has an advantage in aspects of volume and weight, the powertrain having advantages in a gear ratio and a step ratio. Accordingly, drivability can be improved, and seven forward speeds can be simply achieved due to a decrease of the number of operational elements.

Furthermore, since a powertrain according to embodiments of the present invention can be realized by combining only single pinion planetary gear sets, durability thereof can be improved, and productivity and design freedom can also be improved. In addition, a skip shift within three shift speed steps is possible at the forward fourth, fifth, sixth, and seventh speeds through an operation control of the frictional elements. Therefore, a responsiveness of an automatic transmission can be improved, so that an overall performance of the automatic transmission can be improved.

Still furthermore, since the third brake is disposed in a front portion, it is possible to solve the problem in the conventional seven-speed powertrain of hindering a hydraulic line for supplying operating pressure to the first and second clutches.

While this invention has been described in connection with exemplary embodiments, it is to be understood that the invention is not limited to the disclosed embodiment, but, on the contrary, is intended to cover various modifications and equivalent arrangements included within the spirit and scope of the appended claims.

What is claimed is:

1. A seven-speed powertrain for an automatic transmission comprising: a first single pinion planetary gear set having a first sun gear, a first ring gear, and a first planet carrier as an operating member thereof; a second single pinion planetary gear set having a second sun gear, a second ring gear, and a second planet carrier as an operating member thereof; and a third single pinion planetary gear set having a third sun gear, a third ring gear, and a third planet carrier as an operating member thereof, wherein the first, second, and third single pinion planetary gear sets are arranged on an input shaft and combined by a plurality of frictional elements comprising first, second, and third brakes, and first, second, and third clutches, and wherein:

the first ring gear is fixedly connected to the second planet carrier, the second ring gear is fixedly connected to the third planet carrier, and the third ring gear is fixedly connected to the first planet carrier;

the second planet carrier is variably connected to the input shaft via the first clutch that operates at a fourth forward speed, a sixth forward speed, and a seventh forward speed;

the first sun gear is variably connected to the input shaft via the second clutch that operates in a fifth and sixth forward speed and is variably connected to a transmission case via a first brake that operates at a first, second, third, and fourth forward speed;

the second sun gear is fixedly connected to the input shaft to operate always as an input element;

the third planet carrier is variably connected to the transmission case via the second brake that operates at a reverse speed and a one-way clutch that operates at a first forward speed;

the third sun gear is variably connected to the input shaft via the third clutch that operates at the third forward speed and at the reverse speed, and is variably connected to the transmission case via the third brake that operates the second forward speed, the fifth forward speed, and the seventh forward speed; and the third ring gear is connected to an output gear.

2. The seven-speed powertrain of claim 1, wherein:

the third clutch, the second brake, and the third brake are disposed in a front portion inside the transmission case; and the first clutch, the second clutch, and the first brake are disposed in a rear portion inside the transmission case.

3. The seven-speed powertrain of claim 1, wherein the one-way clutch and the second brake are disposed in parallel inside the transmission case and are connected to the third planet carrier.

4. The seven-speed powertrain of claim 1, wherein:

the first brake and the one-way clutch are operated for the first forward speed;

the first brake and the third brake are operated for the second forward speed;

the first brake and the third clutch are operated for the third forward speed;

the first brake and the first clutch are operated for the fourth forward speed;

the second clutch and the third brake are operated for the fifth forward speed;

the first clutch and the second clutch are operated for the sixth forward speed;

the first clutch and the third brake are operated for the seventh forward speed; and the third clutch and the second brake are operated for the reverse speed.

5. The seven-speed powertrain of claim 1, wherein a skip shift within three shift speed steps is possible at the forward fourth, fifth, sixth, and seventh speeds through an operation control of the frictional elements.

6. The seven-speed powertrain of claim 1, wherein:

the third clutch, the second brake, and the third brake are disposed in a front portion inside the transmission case;

the first clutch, the second clutch, and the first brake are disposed in a rear portion inside the transmission case; and the one-way clutch and the second brake are disposed in parallel inside the transmission case and are connected to the third planet carrier, wherein:

the first brake and the one-way clutch are operated for the first forward speed;

the first brake and the third brake are operated for the second forward speed;

the first brake and the third clutch are operated for the third forward speed;

the first brake and the first clutch are operated for the fourth forward speed;

the second clutch and the third brake are operated for the fifth forward speed;

the first clutch and the second clutch are operated for the sixth forward speed;

the first clutch and the third brake are operated for the seventh forward speed; and the third clutch and the second brake are operated for the reverse speed, and wherein a skip shift within three shift speed steps is possible at the forward fourth, fifth, sixth, and seventh speeds through an operation control of the frictional elements.

* * * * *